(12) United States Patent
Bisht et al.

(10) Patent No.: US 10,417,365 B1
(45) Date of Patent: Sep. 17, 2019

(54) SYSTEMS AND METHODS FOR REDUCING POWER CONSUMPTION OF LATCH-BASED CIRCUITS

(71) Applicant: Ansys, Inc., Canonsburg, PA (US)

(72) Inventors: Ajay Singh Bisht, San Jose, CA (US); Allen Baker, San Jose, CA (US)

(73) Assignee: Ansys, Inc., Canonsburg, PA (US)

( * ) Notice: Subject to any disclaimer, the term of this patent is extended or adjusted under 35 U.S.C. 154(b) by 0 days.

(21) Appl. No.: 16/138,013

(22) Filed: Sep. 21, 2018

Related U.S. Application Data (63) Continuation of application No. 15/343,930, filed on Nov. 4, 2016, now Pat. No. 10,083,267.

(60) Provisional application No. 62/251,436, filed on Nov. 5, 2015.

(51) Int. Cl.
  *G06F 17/50* (2006.01)
(52) U.S. Cl.
  CPC ........ *G06F 17/505* (2013.01); *G06F 17/5072* (2013.01)

(58) Field of Classification Search
  USPC .......................................... 716/104
  See application file for complete search history.

(56) References Cited

U.S. PATENT DOCUMENTS

| | | | |
|---|---|---|---|
| 2008/0301594 A1* | 12/2008 | Jiang | G06F 17/5031 716/134 |
| 2011/0218779 A1* | 9/2011 | Palisetti | G06F 17/10 703/2 |
| 2014/0028348 A1* | 1/2014 | Andreev | H03K 19/0948 326/41 |
| 2014/0103959 A1* | 4/2014 | Andreev | H03K 19/018585 326/41 |

* cited by examiner

*Primary Examiner* — Mohammed Alam
(74) *Attorney, Agent, or Firm* — Jones Day (57) ABSTRACT

An example circuit includes: a first clock gating circuit coupled between a first latch and a second latch and configured to provide a first gated clock signal based at least in part on an input clock signal. The first latch is configured to be activated in response to the first gated clock signal being at a first logic level to pass a data input. The second latch is configured to be activated in response to the input clock signal being at a second logic level to pass a first selection signal.

25 Claims, 13 Drawing Sheets

SYSTEMS AND METHODS FOR REDUCING POWER CONSUMPTION OF LATCH-BASED CIRCUITS

CROSS-REFERENCE TO RELATED APPLICATIONS

This application is a continuation application of U.S. patent application Ser. No. 15/343,930, filed Nov. 4, 2016, entitled "Systems and Methods for Reducing Power Consumption of Latch-Based Circuits," which claims priority to U.S. Provisional Patent Application No. 62/251,436, entitled "Systems and Methods for Reducing Power Consumption of Latch-Based Circuits," filed Nov. 5, 2015, the entirety of which is herein incorporated by reference.

TECHNICAL FIELD

The present invention relates to integrated circuit design, and more specifically, to systems and methods related to latch-based circuits.

BACKGROUND

Reduction of power consumption of integrated circuits is of increasing importance when more and more electronic devices are constrained by finite power supplies. There are two types of power consumption in integrated circuits: static and dynamic. Static power is consumed at all times when devices in an integrated circuit are energized, and the static power consumption may change depending on the operating mode of the integrated circuit. The static power consumption usually depends on the semiconductor technology used to synthesize the integrated circuit. On the other hand, dynamic power is consumed only when the state of a device changes. For example, when a node in an integrated circuit changes from a low voltage to a high voltage, the power consumed during that change is classified as dynamic power which is often affected by how the designed circuit functions. Therefore, the dynamic power consumption and the related state change are usually investigated for power reduction during an early stage of a circuit-design process.

Latches are one of the basic building blocks of integrated circuits and often determine circuit speed and power consumption. A latch often includes a circuit that has two stable states and can be used to store state information. A latch may be set to be transparent. That is, the latch forwards signals from its input to its output with no modification, when a control input (e.g., a clock signal) is at a certain logic level. When several transparent latches follow each other, using a same control input, signals can propagate through all of them in a short time period. A transparent latch becomes non-transparent or opaque when a control input (e.g., a clock signal) is at the opposite logic level. An opaque latch holds its output value steady regardless of signals that arrive at its input.

For example, a p-latch becomes transparent in response to a clock signal being at logic high. That is, the p-latch passes a data signal from the input to the output when the clock signal is at logic high. An n-latch becomes transparent in response to a clock signal being at logic low. Large scale integrated circuits may be divided into discrete stages by placing p-latches and/or n-latches to regulate the data flow.

SUMMARY

As disclosed herein, an example circuit includes: a first clock gating circuit coupled between a first latch and a second latch and configured to provide a first gated clock signal based at least in part on an input clock signal. The first latch is configured to be activated in response to the first gated clock signal being at a first logic level to pass a data input. The second latch is configured to be activated in response to the input clock signal being at a second logic level to pass a first selection signal.

As an example, a clock gating circuit includes: a latch configured to receive an input clock signal and an enable signal and provide a control signal based at least in part on the input clock signal and the enable signal; and one or more logic gates configured to receive the input clock signal and the control signal and provide a gated clock signal.

As another example, a computer-implemented method is provided for reducing power consumption of a register-transfer level (RTL) netlist of an integrated circuit (IC) design. For each latch in the RTL netlist, a first condition that the latch's outputs are not observed by a downstream circuit is computed. For each latch in the RTL netlist, a second condition that the latch's inputs are stable for a plurality of consecutive clock cycles associated with a clock signal is computed. An inverted union of the first condition and the second condition is calculated. A new enable signal is generated based at least in part on the calculation of the inverted union.

DETAILED DESCRIPTION

Latches dissipate more power when they are in a transparent state. The present disclosure includes some embodiments for a solution that ensures latches to be transparent only when needed, and also, the present disclosure includes certain embodiments in which such a solution is scalable to large circuit designs.

Figure 1:
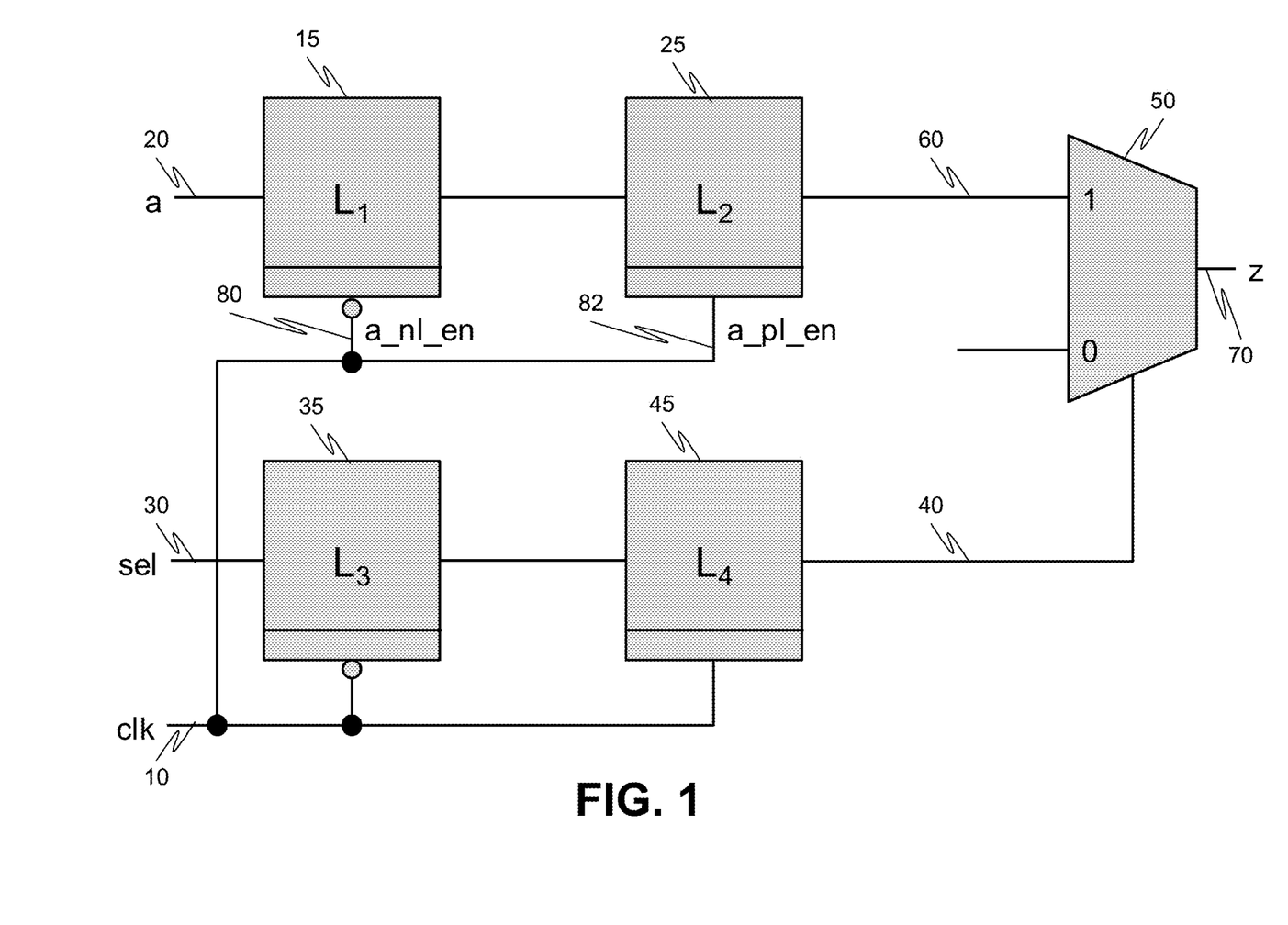
FIG. 1 depicts an example diagram showing a circuit design without a clock gating circuit.

In some circumstances, a sequential element (e.g., a latch) in a data path may not need to be clocked (e.g., be activated in response to a clock signal) when a downstream circuit of the sequential element is not affected by the sequential element passing new data from its input to its output, which is referred to as an observability-don't-care condition (ODC). For example, as shown in FIG. 1, n-latches 15 and 35 and p-latches 25 and 45 are all clocked by a clock signal 10, but during certain time periods, these latches may not all need to be clocked. Specifically, a data input 20 is provided to the n-latch 15, and a selection signal 30 is provided to the n-latch 35. When the output 40 of the p-latch 45 (e.g., corresponding to the selection signal 30) is at logic high (e.g., corresponding to a logic value "1"), a multiplexer 50 selects the output 60 of the p-latch 25 (e.g., corresponding to the data input 20) to provide to the downstream circuit (not shown in FIG. 1). When the output 40 of the p-latch 45 (e.g., corresponding to the selection signal 30) is at logic low (e.g., corresponding to a logic value "0"), the output 60 of the p-latch 25 is not selected to be provided to the downstream circuit which is thus not affected by the output 60, and the p-latch 25 does not need to be clocked in such circumstances.

In certain circumstances, new data received by a sequential element is the same as old data which passed through the sequential element, i.e., a stability condition (STC). To save dynamic power, the sequential element may not be clocked while still providing a valid signal to the downstream circuit. For example, as shown in FIG. 1, if in a given clock cycle, the data input 20 is the same as the data input in the previous clock cycle(s), then at least the n-latch 15 does not need to be clocked in such circumstances.

In an integrated circuit, a clock gating circuit may be designed as described below so that a clock signal does not reach any sequential elements (e.g., latches) in a data flow path which do not need to be clocked in order to save dynamic power consumption.

Figure 2:
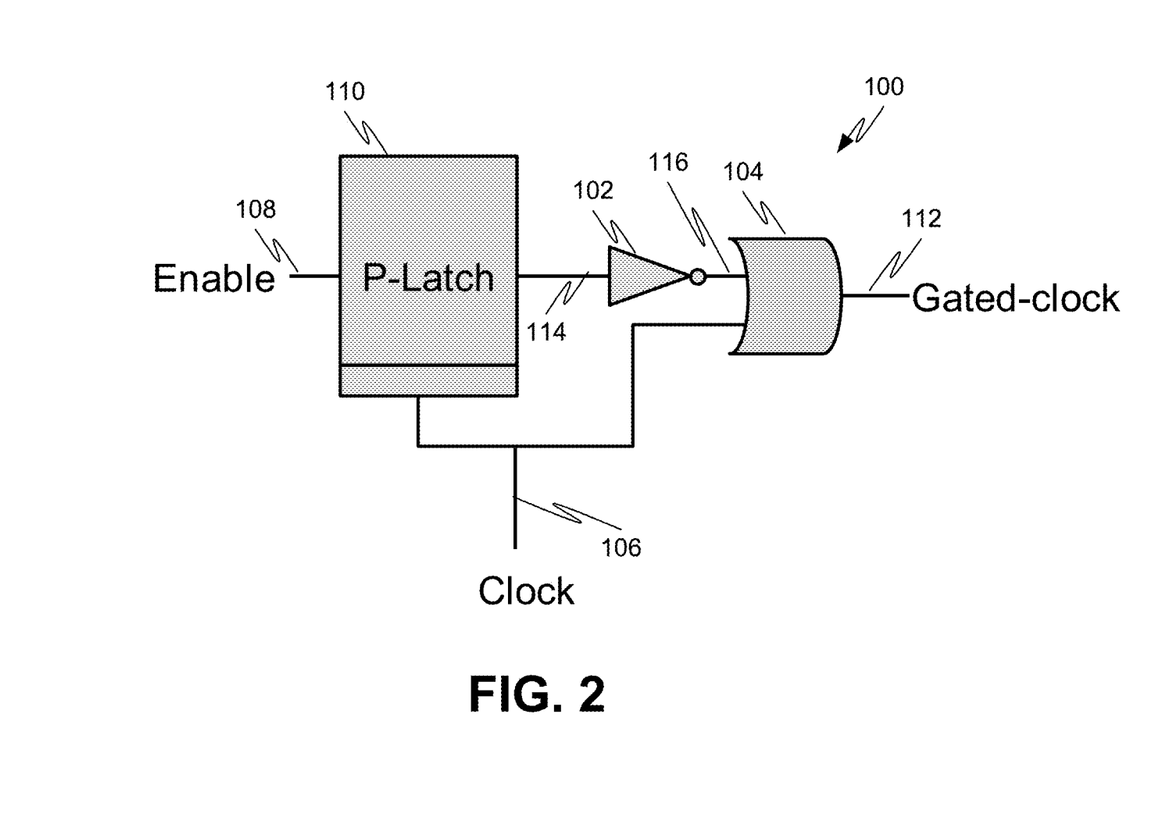
FIG. 2 depicts an example diagram showing a clock gating circuit design for n-type latches.

FIG. 2 depicts an example diagram showing a clock gating circuit design for n-latches. As shown in FIG. 2, the clock gating circuit 100 includes one or more logic gates for providing a gated clock signal 112 based at least in part on an input clock signal 106. Specifically, a p-latch 110 receives the input clock signal 106 and an enable signal 108 and provides a control signal 114 to a NOT gate 102 which provides a signal 116. An OR gate 104 receives the signal 116 and the input clock signal 106 and provides the gated clock signal 112.

When the enable signal 108 is at logic high (e.g., corresponding to a logic value "1"), the gated clock signal 112 corresponds to the input clock signal 106. When the enable signal 108 is at logic low (e.g., corresponding to a logic value "0"), the gated clock signal 112 is held at logic high regardless of the input clock signal 106, which indicates that the clock gating circuit 100 becomes non-transparent or opaque.

Figure 3:
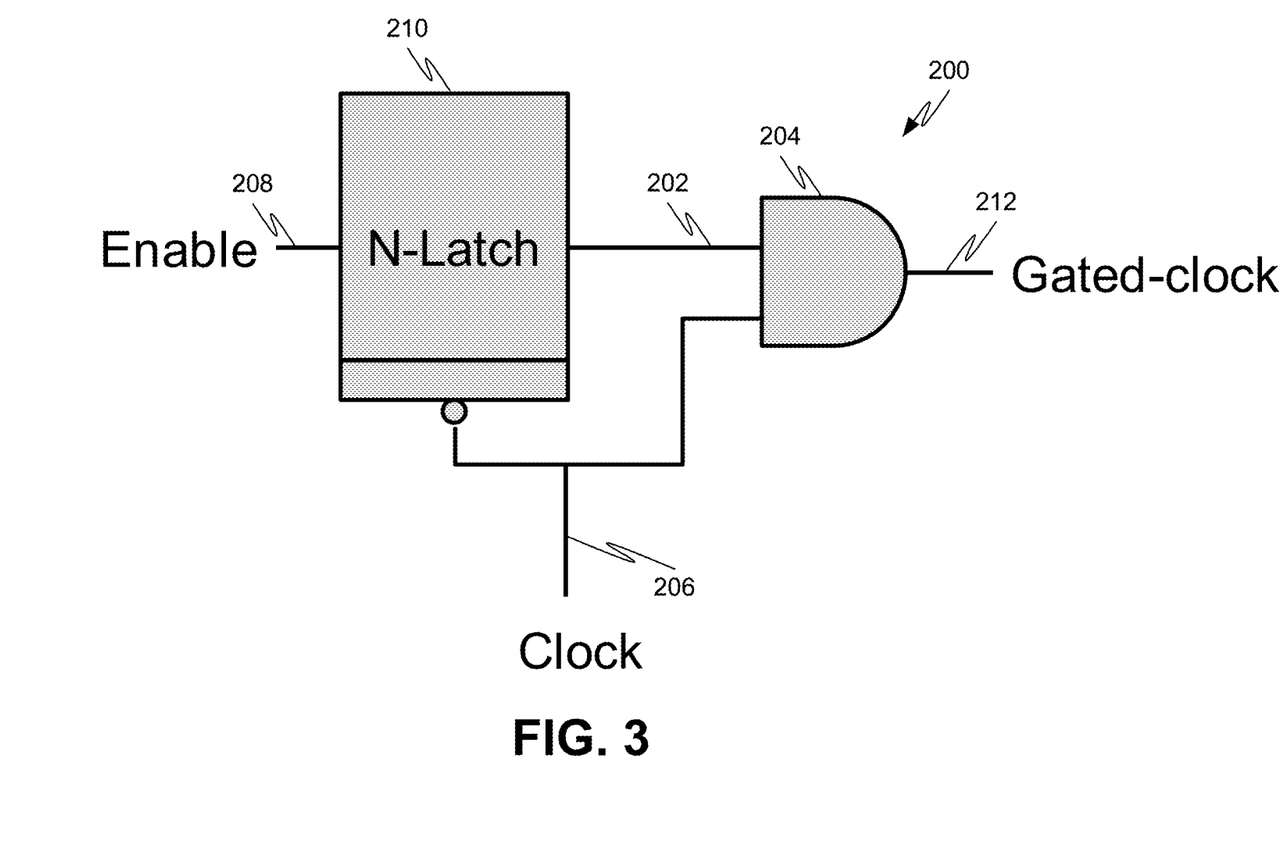
FIG. 3 depicts an example diagram showing another clock gating circuit design for p-type latches.

FIG. 3 depicts an example diagram showing another clock gating circuit design for p-latches. As shown in FIG. 3, the clock gating circuit 200 includes one or more logic gates for providing a gated clock signal 212 based at least in part on an input clock signal 206. Specifically, an n-latch 210 receives the input clock signal 206 and an enable signal 208 and provides a control signal 202. An AND gate 204 receives the signal 202 and the input clock signal 206 and provides the gated clock signal 212.

When the enable signal 208 is at logic high (e.g., corresponding to a logic value "1"), the gated clock signal 212 corresponds to the input clock signal 206. When the enable signal 208 is at logic low (e.g., corresponding to a logic value "0"), the gated clock signal 212 is held at logic low regardless of the input clock signal 206, which indicates that the clock gating circuit 200 becomes non-transparent or opaque.

Figure 4:
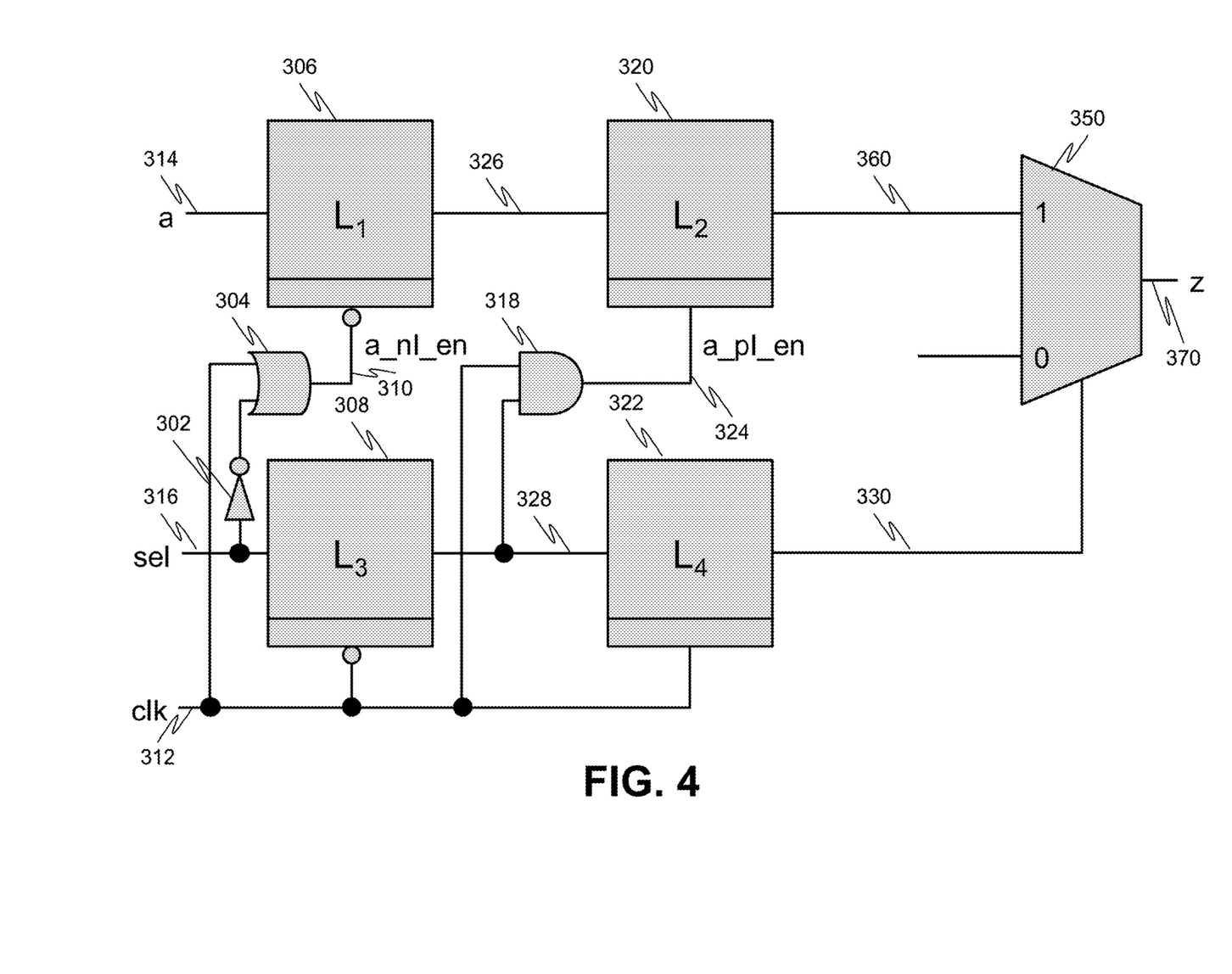
FIG. 4 depicts an example diagram showing a circuit design involving clock gating circuits.

FIG. 4 depicts an example diagram showing a circuit design involving clock gating circuits. As shown in FIG. 4, with one or more clock gating circuits, an input clock signal 312 does not reach certain sequential elements (e.g., latches) in a data flow path under certain circumstances.

Specifically, a clock gating circuit that includes a NOT gate 302 and an OR gate 304 provides a gated clock signal 310 (a_nl_en) based at least in part on the input clock signal 312. The n-latch 306 is activated (e.g., becomes transparent) in response to the gated clock signal 310 being at logic low to pass a data input 314. The n-latch 308 is activated (e.g., becomes transparent) in response to the input clock signal 312 being at logic low to pass a selection signal 316.

Another clock gating circuit that includes an AND gate 318 provides another gated clock signal 324 (a_pl_en) based at least in part on the input clock signal 312. The p-latch 320 is activated (e.g., becomes transparent) in response to the gated clock signal 324 being at logic high to pass the output 326 of the n-latch 306. The p-latch 322 is activated (e.g., becomes transparent) in response to the input clock signal 312 being at logic high to pass the output 328 of the n-latch 308.

When the output 330 of the p-latch 322 (e.g., corresponding to the selection signal 316) is at logic high (e.g., corresponding to a logic value "1"), a multiplexer 350 selects the output 360 of the p-latch 320 (e.g., corresponding to the data input 314) to provide to a downstream circuit (not shown in FIG. 4). In response to the selection signal 316 being at logic high, the gated clock signals 310 and 324 both correspond to the input clock signal 312 and thus both the n-latch 306 and the p-latch 320 are clocked.

When the output 330 of the p-latch 322 is at logic low (e.g., corresponding to a logic value "0"), the output 360 of the p-latch 320 is not selected to be provided to the downstream circuit. In response to the selection signal 316 being at logic low, the gated clock signal 310 is kept at logic high and the gate clock signal 324 is kept at logic low. Thus neither the n-latch 306 nor the p-latch 320 is clocked.

Figure 5:
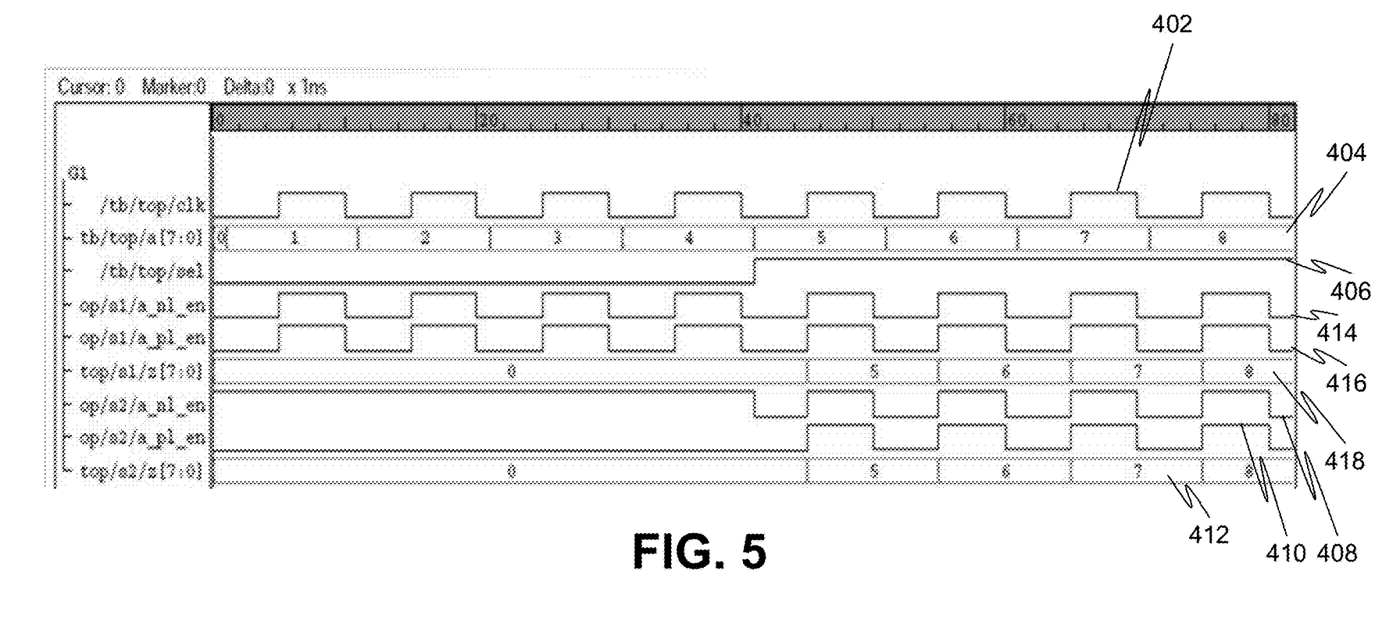
FIG. 5 depicts an example timing diagram for the circuit designs as shown in FIG. 3 and FIG. 4.

FIG. 5 depicts an example timing diagram for the circuit design as shown in FIG. 4. As shown in FIG. 5, the waveform 402 represents the input clock signal 312 changing over time, the waveform 406 represents the selection signal 316 changing over time, the waveform 408 represents the gated clock signal 310 changing over time, and the waveform 410 represents the gated clock signal 324 changing over time. The data streams 404 and 412 represent the data input 314 and the data output 370 respectively. In addition, the waveform 414 represents an enable signal 80 (e.g., as shown in FIG. 1) changing over time, the waveform 416 represents an enable signal 82 (e.g., as shown in FIG. 1) changing over time, and the data streams 418 represent the data output 70 (e.g., as shown in FIG. 1).

As shown in FIG. 5, the input clock signal 312 corresponds to a simple periodic square-wave signal. The selection signal 316 changes between logic low and logic high, and keeps at a certain logic level over multiple clock cycles. When the selection signal 316 is at logic low, the gated clock signal 310 keeps at logic high, and the gated clock signal 324 keeps at logic low. Thus, the n-latch 306 and the p-latch 320 are not clocked. As a result, the data output 370 does not change. When the selection signal 316 is at logic high, the gated clock signal 310 and the gated clock signal 324 both follow the input clock signal 312, and the n-latch 306 and the p-latch 320 are both clocked. As a result, the data output 370 follows the data input 314 with a certain delay.

Furthermore, the data output 70 (e.g., as shown by the data stream 418) and the data output 370 (e.g., as shown by the data stream 412) are approximately the same over time. Thus, the implementation of the clock gating circuits (e.g., as shown in FIG. 4) does not affect the data output but improves power consumption, according to certain embodiments.

Figure 6:
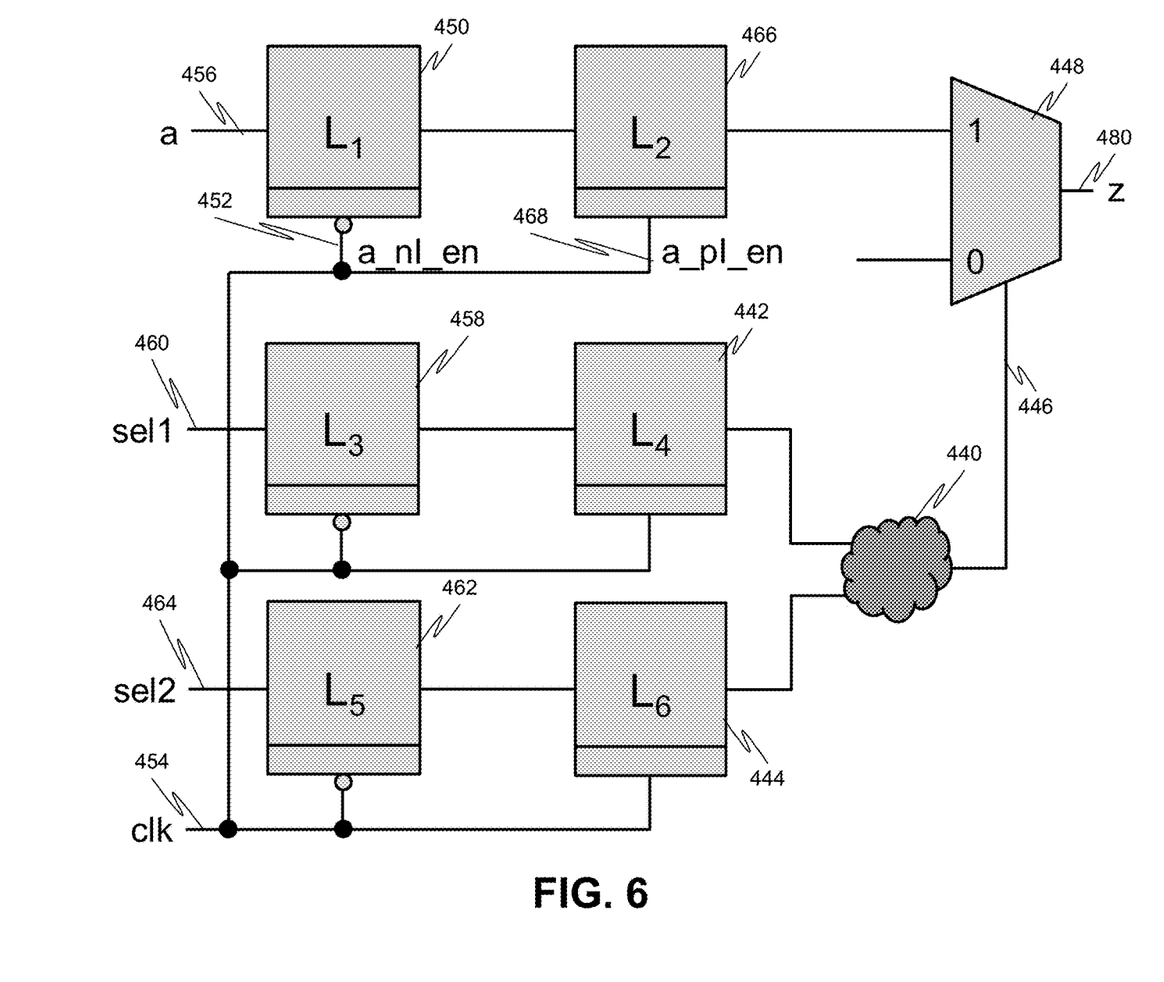
FIG. 6 depicts an example diagram showing a circuit design without clock gating circuits.

FIG. 6 depicts an example diagram showing a circuit design without clock gating circuits. As shown in FIG. 6, a signal processing component 440 performs pre-computation by combining outputs of p-latches 442 and 444 which correspond to selection signals 460 and 464 respectively, and provides a combined signal 446 to a multiplexer 448 for passing a data input 456 to a downstream circuit (not shown in FIG. 6).

Specifically, an n-latch 450 is activated (e.g., becomes transparent) in response to an enable signal 452 (e.g., corresponding to an input clock signal 454) being at logic low to pass the data input 456. An n-latch 458 is activated (e.g., becomes transparent) in response to the input clock signal 454 being at logic low to pass a first selection signal 460, and another n-latch 462 is activated (e.g., becomes transparent) in response to the input clock signal 454 being at logic low to pass a second selection signal 464.

A p-latch 466 is activated (e.g., becomes transparent) in response to an enable signal 468 (e.g., corresponding to an input clock signal 454) being at logic high to pass the output of the n-latch 450. A p-latch 442 is activated (e.g., becomes transparent) in response to the input clock signal 454 being at logic high to pass the output of the n-latch 458, and another p-latch 444 is activated (e.g., becomes transparent) in response to the input clock signal 454 being at logic high to pass the output of the n-latch 462.

When the combined signal 446 is at logic high (e.g., corresponding to a logic value "1"), the multiplexer 448 selects the output of the p-latch 466 (e.g., corresponding to the data input 456) to provide to a downstream circuit (not shown in FIG. 6). When the combined signal 446 is at logic low (e.g., corresponding to a logic value "0"), the output of the p-latch 446 is not selected to be provided to the downstream circuit.

As shown in FIG. 6, the n-latch 450 and the p-latch 466 are directly clocked by the input clock signal 454, but during certain time periods, these latches may not all need to be clocked. Clock gating circuits can be implemented to reduce power consumption, according to some embodiments.

Figure 7:
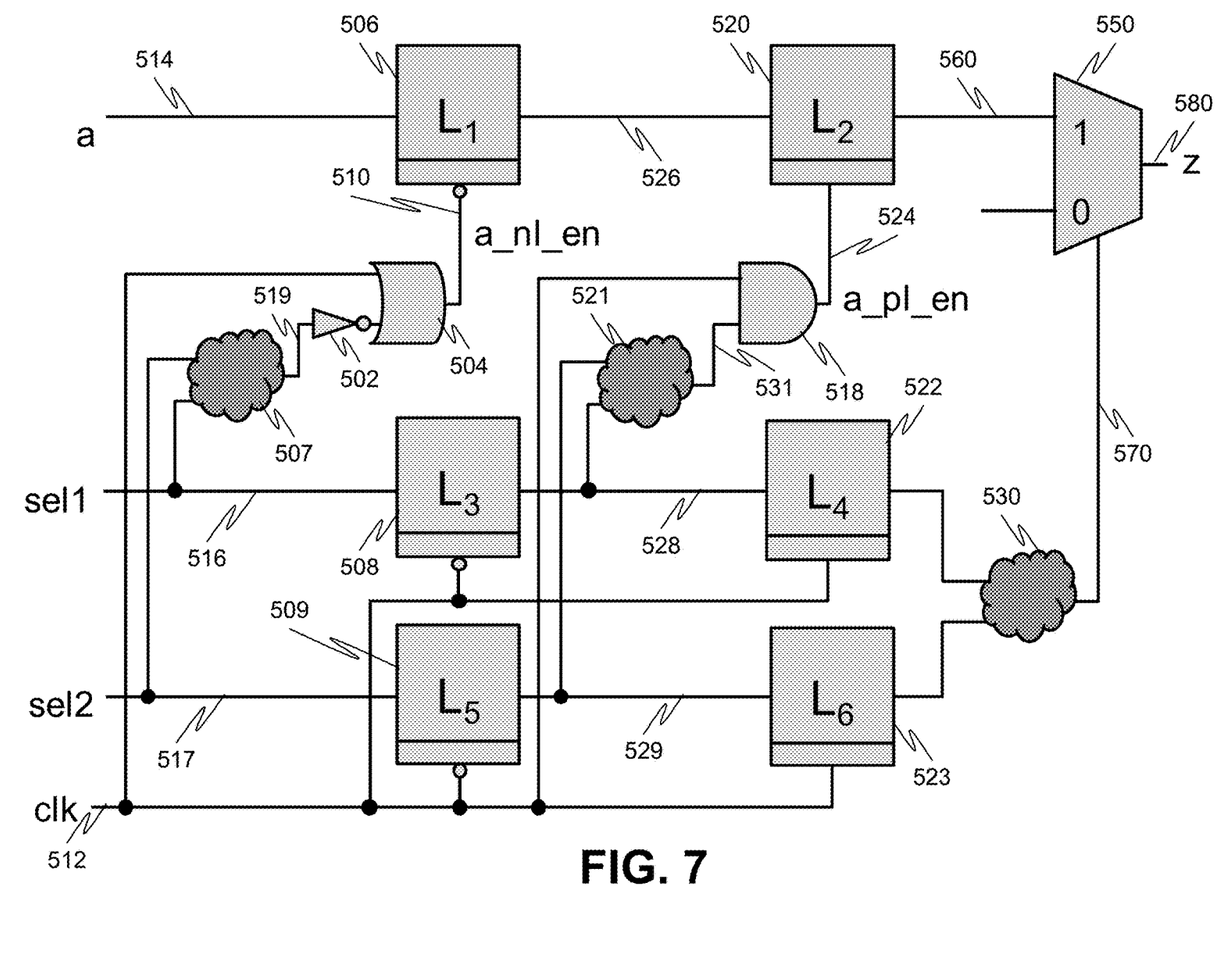
FIG. 7 depicts an example diagram showing another circuit design involving clock gating circuits.

FIG. 7 depicts an example diagram showing a circuit design involving clock gating circuits. As shown in FIG. 7, with clock gating circuits, an input clock signal 512 does not reach certain sequential elements (e.g., latches) in a data flow path under certain circumstances.

Specifically, a clock gating circuit that includes a NOT gate 502, an OR gate 504 and a signal processing component provides a gated clock signal 510 (a_nl_en) based at least in part on an input clock signal 512. The n-latch 506 is activated (e.g., becomes transparent) in response to the gated clock signal 510 being at logic low to pass a data input 514. The n-latch 508 is activated (e.g., becomes transparent) in response to the input clock signal 512 being at logic low to pass a first selection signal 516, and the n-latch 509 is activated (e.g., becomes transparent) in response to the input clock signal 512 being at logic low to pass a second selection signal 517. The signal processing component 507 combines the first selection signal 516 and the second selection signal 517 and provides a combined signal 519 to the NOT gate 502. As an example, the signal processing component 507 includes an OR gate.

Another clock gating circuit that includes an AND gate 518 and a signal processing component 521 provides another gated clock signal 524 (a_pl_en) based at least in part on the input clock signal 512. The p-latch 520 is activated (e.g., becomes transparent) in response to the gated clock signal 524 being at logic high to pass the output 526 of the n-latch 506. The p-latch 522 is activated (e.g., becomes transparent) in response to the input clock signal 512 being at logic high to pass the output 528 of the n-latch 508, and the p-latch 523 is activated (e.g., becomes transparent) in response to the input clock signal 512 being at logic high to pass the output 529 of the n-latch 509. The signal processing component 521 combines the output 528 of the n-latch 508 and the output 529 of the n-latch 509 and provides a combined signal 531 to the AND gate 518. Another signal processing component 530 combines the outputs of the p-latches 522 and 523 and provides a combined signal 570 to a multiplexer 550. As an example, the signal processing components 521 and 530 each include an OR gate. In some embodiments, the signal processing component 530 is configured the same as the signal processing component 507 and the signal processing component 521.

When the combined signal 570 is at logic high (e.g., corresponding to a logic value "1"), the multiplexer 550 selects the output 560 of the p-latch 520 (e.g., corresponding to the data input 514) to provide to a downstream circuit (not shown in FIG. 7). Similar to the combined signal 570, the combined signals 519 and 531 are at logic high. Thus, the gated clock signals 510 and 524 both correspond to the input clock signal 512, and both the n-latch 506 and the p-latch 520 are clocked.

When the combined signal 570 is at logic low (e.g., corresponding to a logic value "0"), the output 560 of the p-latch 520 is not selected to be provided to the downstream circuit. Similar to the combined signal 570, the combined signals 519 and 531 are at logic low. Thus the gated clock signal 510 is kept at logic high and the gate clock signal 524 is kept at logic low, and thus neither the n-latch 506 nor the p-latch 520 is clocked.

Figure 8:
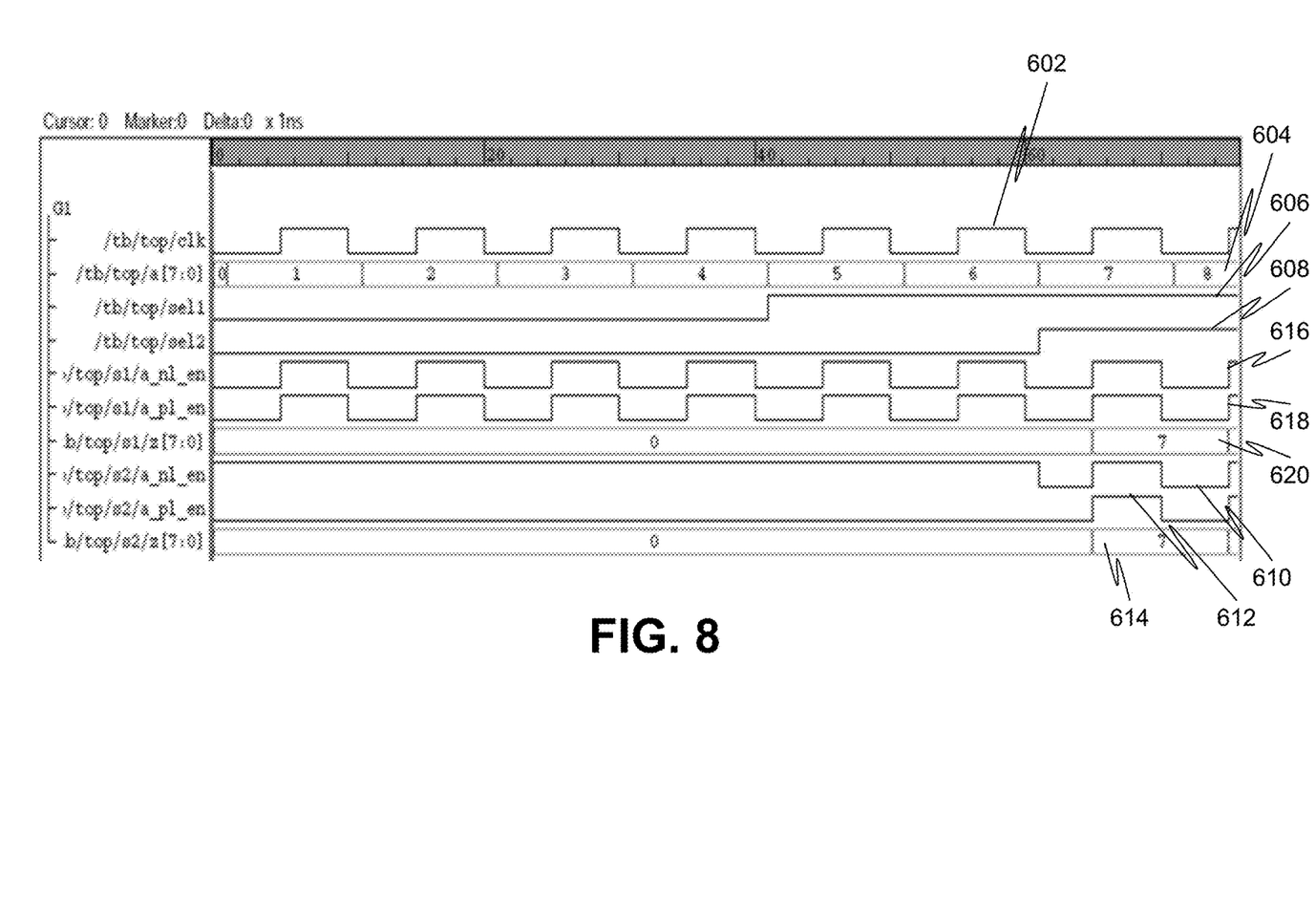
FIG. 8 depicts an example timing diagram for the circuit designs as shown in FIG. 6 and FIG. 7.

FIG. 8 depicts an example timing diagram for the circuit design as shown in FIG. 7. As shown in FIG. 8, the waveform 602 represents the input clock signal 512 changing over time, the waveform 606 represents the first selection signal 516 changing over time, the waveform 608 represents the second selection signal 517 changing over time, the waveform 610 represents the gated clock signal 510 changing over time, and the waveform 612 represents the gated clock signal 524 changing over time. The data streams 604 and 614 represent the data input 514 and the data output 580 respectively. In addition, the waveform 616 represents the enable signal 452 (e.g., as shown in FIG. 6) changing over time, the waveform 618 represents the enable signal 468 (e.g., as shown in FIG. 6) changing over time, and the data streams 620 represent a data output 480 (e.g., as shown in FIG. 6).

As shown in FIG. 8, the input clock signal 512 corresponds to a simple periodic square-wave signal. The first selection signal 516 and the second selection signal 517 change between logic low and logic high (e.g., asynchronously), and keep at a certain logic level over multiple clock cycles (e.g., asynchronously). When both the first selection signal 516 and the second selection signal 517 are at logic low, the combined signals 519 and 531 are both at logic low. In response, the gated clock signal 510 keeps at logic high, and the gated clock signal 524 keeps at logic low. Thus, the n-latch 506 and the p-latch 520 are not clocked. As a result, the data output 580 does not change. When the first selection signal 516 changes to logic high and the second selection signal 517 remains logic low, the combined signals 519 and 531 are both at logic low, and thus the data output 580 does not change.

When the first selection signal 516 and the second selection signal 517 are both at logic high, the combined signals 519 and 531 are both at logic high. In response, the gated clock signal 510 and the gated clock signal 524 both follow the input clock signal 512, and the n-latch 506 and the p-latch 520 are both clocked. As a result, the data output 580 follows the data input 514 with a certain delay.

Furthermore, the data output 480 (e.g., as shown by the data stream 620) and the data output 580 (e.g., as shown by the data stream 614) are approximately the same over time. Thus, the implementation of the clock gating circuits (e.g., as shown in FIG. 7) does not affect the data output but improves power consumption, according to certain embodiments.

Figure 9:
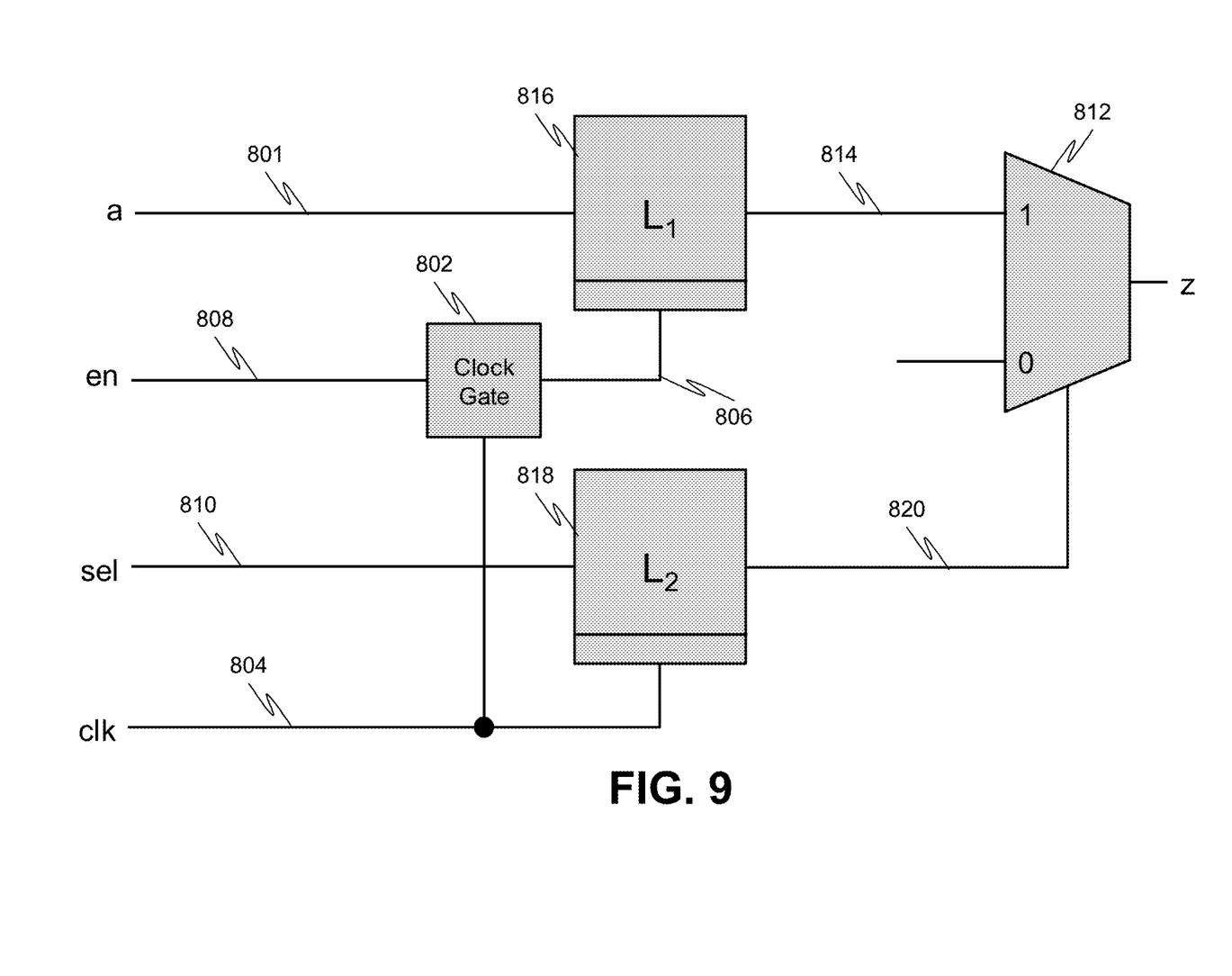
FIG. 9 depicts an example diagram showing a circuit design involving a clock gating circuit.

FIG. 9 depicts an example diagram showing a circuit design involving a clock gating circuit. As shown in FIG. 9, the clock gating circuit 802 may not prevent an input clock signal 804 from reaching certain sequential elements in a data flow path at times when such sequential elements do not need to be clocked, which may result in inefficient dynamic power consumption. Specifically, the clock gating circuit 802 provides a gated clock signal 806 based at least in part on the input clock signal 804 and an enable signal 808 which is different from a selection signal 810. A multiplexer 812 selects the output 814 of a p-latch 816 which corresponds to a data input 801 when the output 820 of a p-latch 818 which corresponds to the selection signal 810 is at logic high. The multiplexer 812 does not select the output 814 of the p-latch 816 when the output 820 of the p-latch 818 is at logic low, while the enable signal 808 may be at logic high and thus the gated clock signal 806 still follows the input clock signal 804 even though the p-latch 816 does not need to be clocked.

Figure 10:
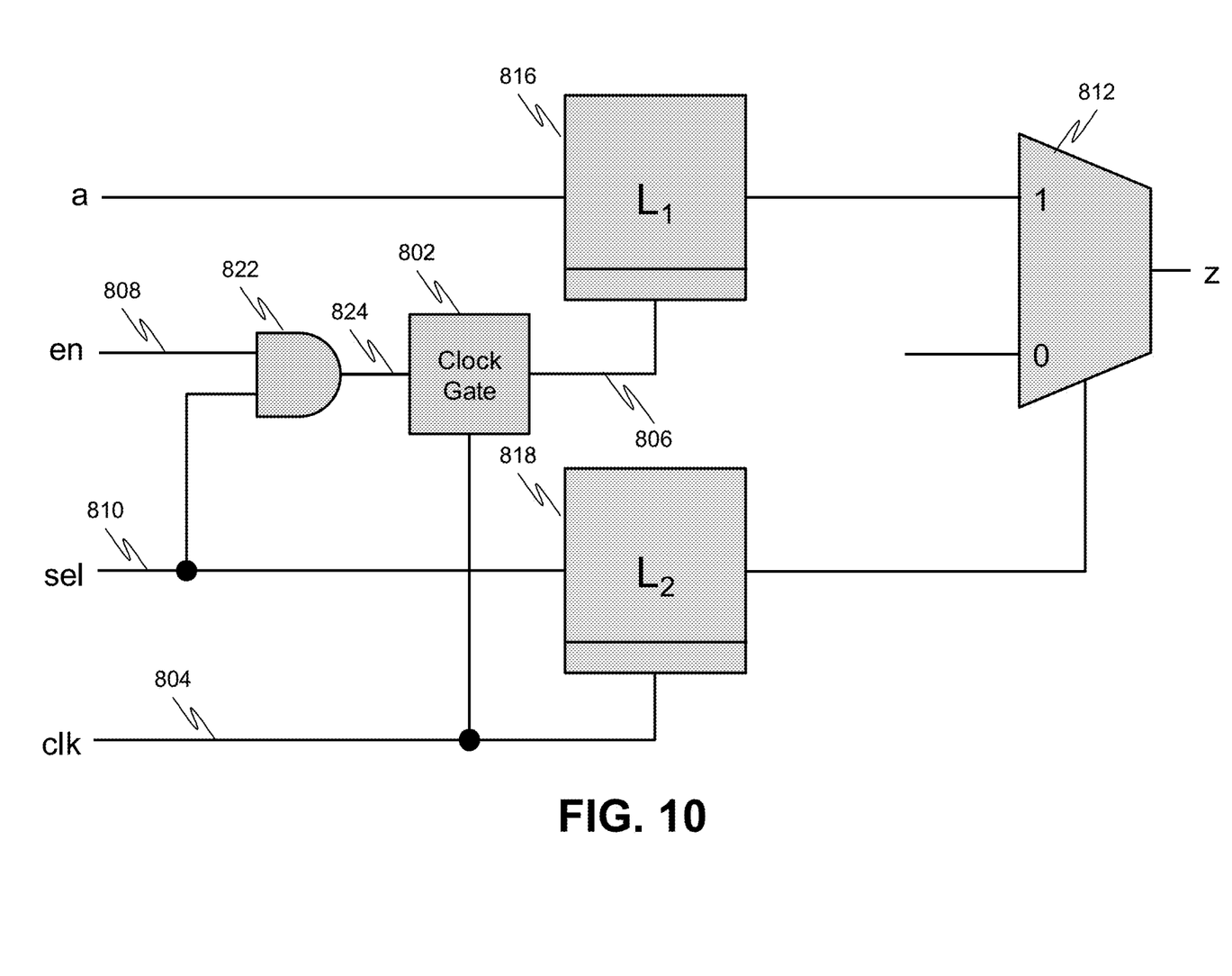
FIG. 10 depicts an example diagram showing another circuit design involving a clock gating circuit that is strengthened by an observability-don't-care condition.

An AND gate can be added to the circuit design to solve this problem, as shown in FIG. 10. The AND gate 822 combines the enable signal 808 and the selection 810 and provides a combined signal 824 to the clock gating circuit 802. Thus, when the output of the p-latch 818 which corresponds to the selection signal 810 is at logic low, the multiplexer 812 does not select the output of the p-latch 816 which corresponds to the data input 801. At the same time, the combined signal 824 is at logic low which may result in the gated clock signal 806 keeping at a certain logic level without following the input clock signal 804, and thus the p-latch 816 is not clocked.

Figure 11:
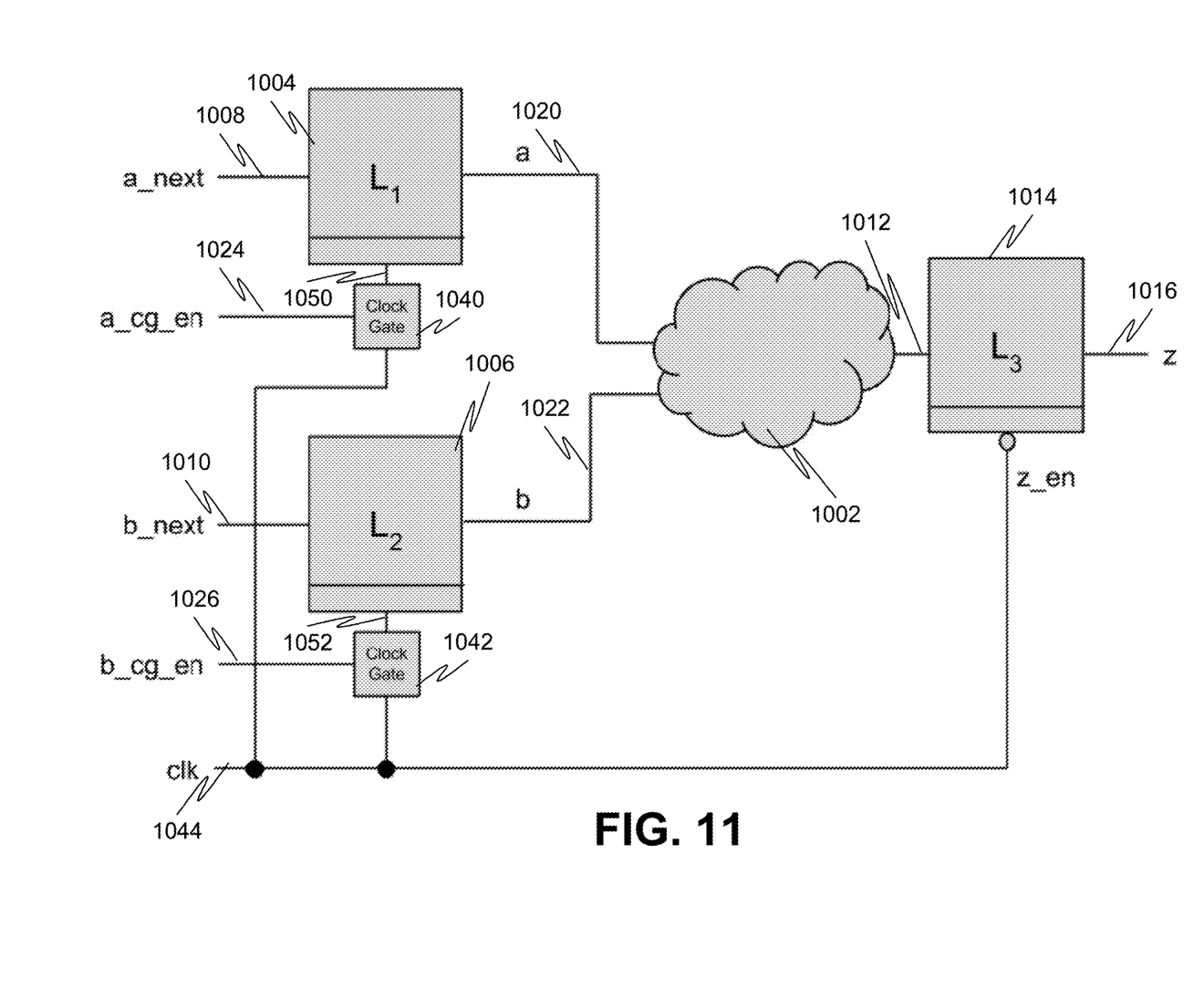
FIG. 11-FIG. 13 depict example diagrams showing clock-gating using stability conditions.
Figure 12:
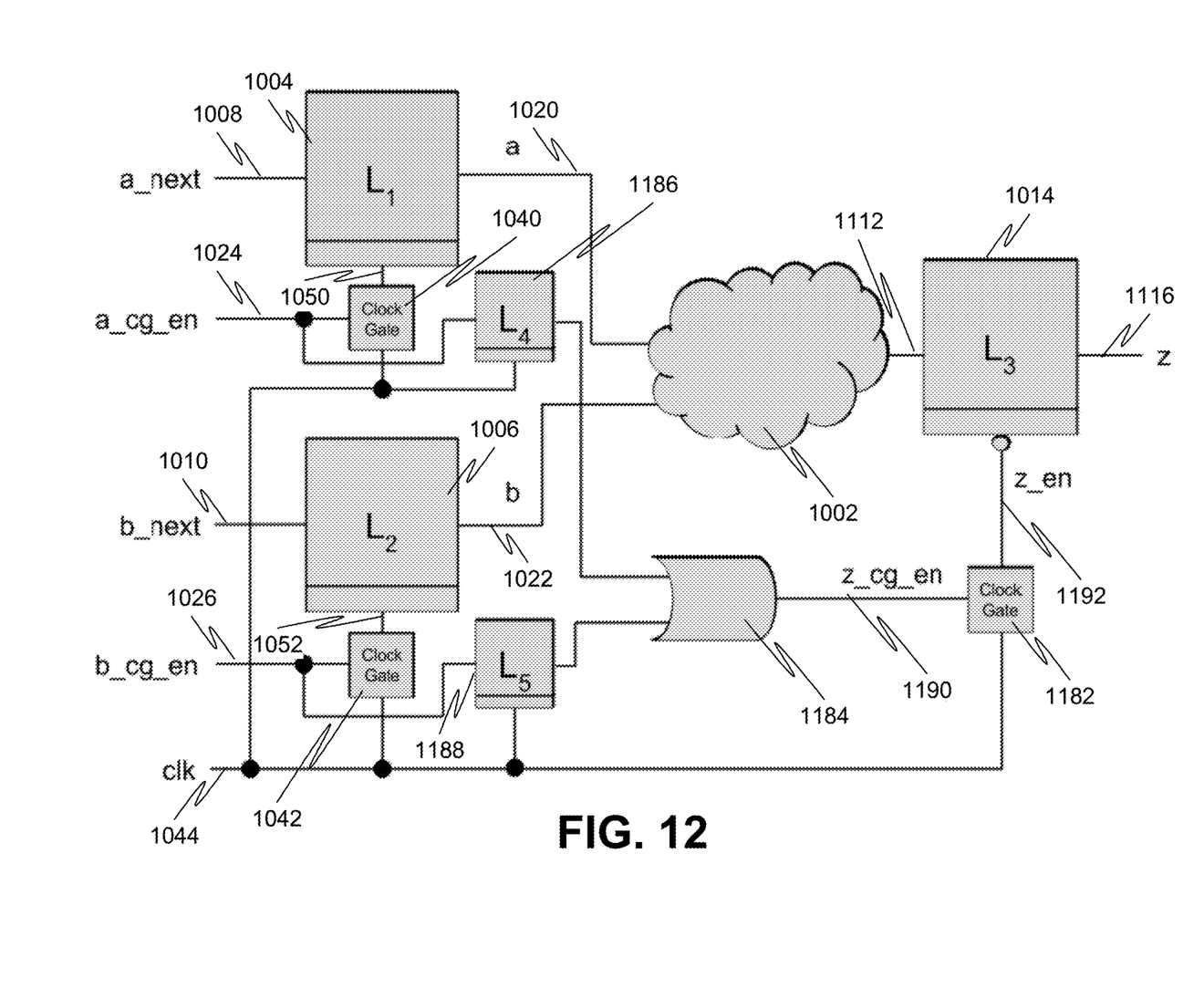
Figure 13:
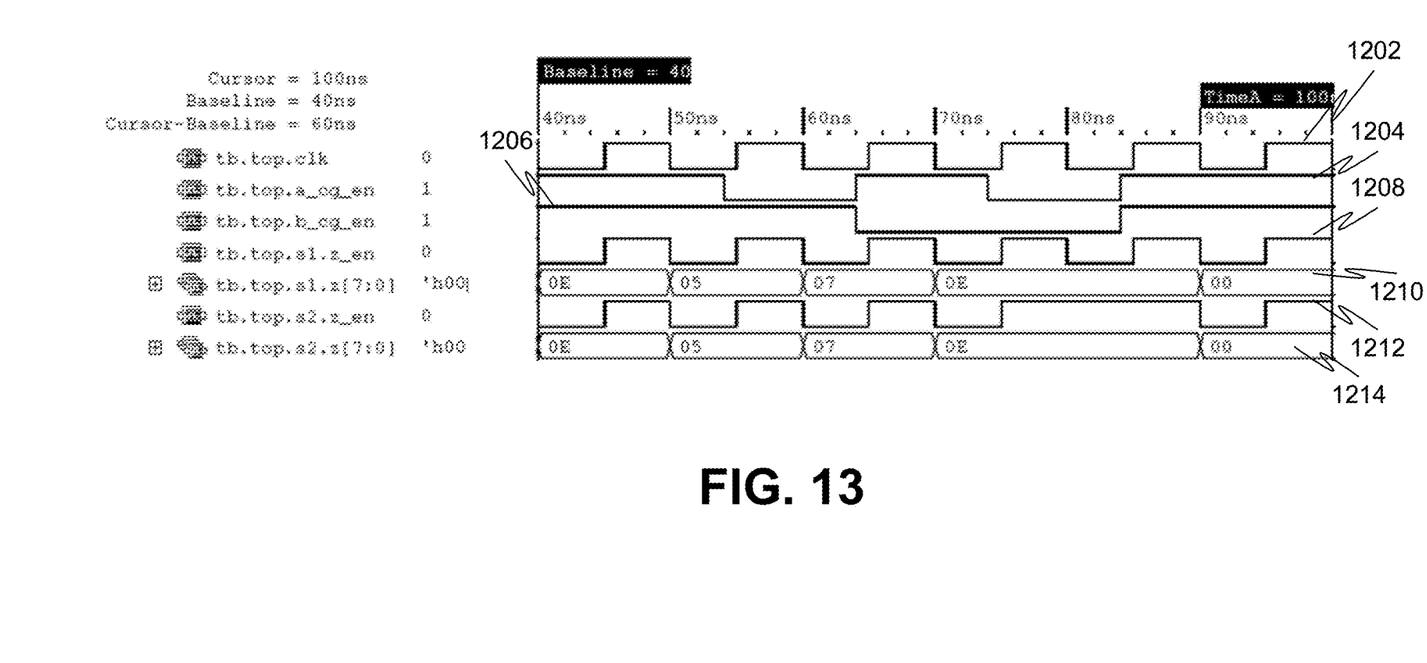

FIG. 11-FIG. 13 depict example diagrams showing clock-gating using stability conditions. As shown in FIG. 11, clock gating circuits 1040 and 1042 are provided for clocking p-latches 1004 and 1006, respectively. In contrast, an n-latch 1014 is directly clocked by the input clock signal 1044. Specifically, the p-latch 1004 is activated (e.g., becomes transparent) in response to a gated clock signal 1050 from the clock gating circuit 1040 being at logic high to pass a first data input 1008. The p-latch 1006 is activated (e.g., becomes transparent) in response to a gated clock signal 1052 from the clock gating circuit 1042 being at logic high to pass a second data input 1010. Outputs 1020 and 1022 of the p-latches 1004 and 1006 correspond to the data inputs 1008 and 1010, respectively. A signal processing component 1002 performs pre-computation by combining the outputs 1020 and 1022, and provides a combined signal 1012 to the n-latch 1014 that provides an output signal 1016 to a downstream circuit (not shown in FIG. 11).

The clock gating circuit 1040 provides the gated clock signal 1050 based at least in part on the input clock signal 1044 and an enable signal 1024, and the clock gating circuit 1042 provides the gated clock signal 1052 based at least in part on the input clock signal 1044 and another enable signal 1026. With the clock gating circuits 1040 and 1042, the p-latches 1004 and 1006 are not directly clocked by the input clock signal 1044. In some embodiments, the clock gating circuits 1040 and 1042 include one or more NOT gates, one or more OR gates and/or one or more signal processing components (e.g., similar to those clock gating circuits described above).

In some circumstances, the n-latch 1014 may not need to be clocked directly by the input clock signal 1044. For example, when both the enable signals 1024 and 1026 are at logic low, the p-latches 1004 and 1006 become non-transparent or opaque and hold the respective outputs steady regardless of the data inputs 1008 and 1010. At this time, the n-latch 1014 may not need to be clocked directly by the input clock signal 1044. A clock gating circuit and/or other components can be implemented for the n-latch 1014 to further reduce power consumption, according to some embodiments.

As shown in FIG. 12, a signal processing component 1184 receive outputs of p-latches 1186 and 1188 which correspond to the enable signals 1024 and 1026 respectively. A clock gating circuit 1182 provides a gated clock signal 1192 based at least in part on an enable signal 1190 from the signal processing component 1184 and the input clock signal 1044. As an example, the signal processing component 1184 includes an OR gate.

Specifically, the p-latch 1186 is activated (e.g., becomes transparent) in response to the input clock signal 1144 being at logic high to pass the enable signal 1024. The p-latch 1188 is activated (e.g., becomes transparent) in response to the input clock signal 1044 being at logic high to pass the enable signal 1026. In some embodiments, the latches 1004, 1006 and 1014 correspond to multi-bit latches, and the latches 1186 and 1188 correspond to single-bit latches.

The circuit design as shown in FIG. 12 can ensure the outputs of the latches to be stable when clock gating circuits for the latches are disabled. FIG. 13 depicts an example timing diagram for the circuit designs as shown in FIG. 11 and FIG. 12. As shown in FIG. 13, the waveform 1202 represents the input clock signal 1044 changing over time, the waveform 1204 represents the enable signal 1024 changing over time, and the waveform 1206 represents the enable signal 1026 changing over time. In addition, the waveform 1208 represents the signal that clocks the n-latch 1014 as shown in FIG. 11 (i.e., the input clock signal 1044) changing over time, the data stream 1210 represents the data output 1016 (e.g., as shown in FIG. 11) changing over time, the waveform 1212 represents the gated clock signal 1192 (e.g., as shown in FIG. 12) changing over time, and the data stream 1214 represents the data output 1116 (e.g., as shown in FIG. 12) changing over time.

As shown in FIG. 13, the input clock signal 1044 corresponds to a simple periodic square-wave signal. The enable signals 1024 and 1026 change between logic low and logic high (e.g., asynchronously), and keep at a certain logic level over multiple clock cycles (e.g., asynchronously). When both the enable signals 1024 and 1026 are at logic low (e.g., during the time period from 74 ns to 84 ns), the n-latch 1014 in the circuit design of FIG. 11 is not clocked. In contrast, when both the enable signals 1024 and 1026 are at logic low, the n-latch 1014 in the circuit design of FIG. 12 is clocked by the enable signal 1192 which keeps at logic high (e.g., as shown by the waveform 1212 in FIG. 13) regardless of the input clock signal 1044 to further reduce power consumption. The data output 1016 of the circuit design of FIG. 11 and the data output 1116 of the circuit design of FIG. 12 are identical (e.g., as shown by the data streams 1210 and 1214 in FIG. 13).

The present disclosure provides many different embodiments, or examples, for implementing different features of the invention. Specific examples of components and arrangements are described herein to simplify the present disclosure. These are, of course, merely examples and are not intended to be limiting. For example, the present disclosure may repeat reference numerals and/or letters in the various examples. This repetition is for the purpose of simplicity and clarity and does not in itself dictate a relationship between the various embodiments and/or configurations discussed.

Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

For example, the systems and methods disclosed herein are configured to determine efficiency of various clock-gating conditions and implement latches efficiently. As an example, the systems and methods disclosed herein are configured to perform reduction of transparent periods of latches in an integrated circuit by using stability and observability based techniques. In some embodiments, the systems and methods disclosed herein are configured to analyze fan-in and fan-out cones of latches across multiple clock cycles to determine a set of conditions under which one or more latches are not required to be transparent and clock-gate the latches under these conditions in order to reduce power consumption of latch based design at register transfer level.

The methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of non-transitory computer-readable storage medium that is stored at a single location or distributed across multiple locations. The medium can include computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example, as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The invention claimed is:

1. A computer-implemented method for reducing power consumption of an integrated circuit (IC) according to an IC design, the method comprising:
    accessing a register transfer level (RTL) netlist of the IC design, the RTL netlist comprising a RTL representation of the IC;
    computing a first set of conditions of a first latch in the RTL netlist that indicates whether an output of the first latch is observable by a downstream circuit;
    computing, a second set of conditions including at least one stability condition for the first latch;
    calculating a set of enable conditions based on the first set of conditions and the second set of conditions;
    generating a clock gate circuit based on the set of enable conditions, the clock gate circuit including a second latch and a logic gate comprising an OR gate or an AND gate; and
    modifying the IC design by revising the RTL netlist to include the clock gate circuit.

2. The method of claim 1, wherein the generated clock gate circuit is inserted between a clock signal and a clock input of the second latch in the revised RTL netlist, wherein the enable signal is connected to the clock gate circuit, and wherein the second latch receives an enable signal and is clocked by the clock signal.

3. The method of claim 2, wherein the second latch is a p-type latch and the logic gate is an OR gate.

4. The method of claim 2, wherein the second latch is an n-type latch and the logic gate is an AND gate.

5. The method of claim 2, wherein the first latch has an existing clock gate with an original enable signal;
    wherein calculating the set of enable conditions is further based on at least a portion of enable condition logic used in generating the existing clock gate.

6. The method of claim 5,
    wherein modifying the IC design by revising the RTL netlist comprises:
        combining at least a portion of logic of enable condition logic used in generating the existing clock gate with at least a portion of logic associated with the enable conditions.

7. The method of claim 1, wherein the RTL netlist is associated with a prototype integrated circuit design.

8. The method of claim 1, wherein the RTL netlist is representative of a physical integrated circuit.

9. The method of claim 1, wherein a physical integrated circuit is manufactured based on the revised RTL netlist.

10. The method of claim 1, wherein power consumption of an integrated circuit manufactured according to the revised RTL netlist is less than power consumption of an integrated circuit manufactured according to the RTL netlist pre-revising.

11. The method of claim 1, wherein the RTL netlist comprises a plurality of serially connected latches.

12. The method of claim 1, wherein calculating the set of enable conditions includes evaluating whether an integrated circuit parameter will be violated by updating the IC design according to the set of enable conditions.

13. A computer-implemented system for reducing power consumption of an integrated circuit (IC) according to an IC design, the system comprising:
  a processing system comprising one or more data processors;
  a computer-readable medium encoded with instructions for commanding the processing system to execute steps of a method of integrated circuit design that include:
    accessing a register transfer level (RTL) netlist of the IC design, the RTL netlist comprising a RTL representation of the IC;
    computing a first set of conditions of a first latch in the RTL netlist that indicates whether an output of the first latch is observable by a downstream circuit;
    computing, a second set of conditions including at least one stability condition for the first latch;
    calculating a set of enable conditions based on the first set of conditions and the second set of conditions;
    generating a clock gate circuit based on the set of enable conditions, the clock gate circuit including a second latch and a logic gate comprising an OR gate or an AND gate; and
    modifying the IC design by revising the RTL netlist to include the clock gate circuit.

14. The system of claim 13 wherein the generated clock gate circuit is inserted between a clock signal and a clock input of the second latch in the revised RTL netlist, wherein the enable signal is connected to the clock gate circuit, and wherein the second latch receives an enable signal and is clocked by the clock signal.

15. The system of claim 14, wherein the second latch is a p-type latch and the logic gate is an OR gate.

16. The system of claim 14, wherein the second latch is an n-type latch and the logic gate is an AND gate.

17. The system of claim 14, wherein the first latch has an existing clock gate with an original enable signal;
  wherein calculating the set of enable conditions is further based on at least a portion of enable condition logic used in generating the existing clock gate.

18. The system of claim 17,
  wherein modifying the IC design by revising the RTL netlist comprises:
    combining at least a portion of logic of enable condition logic used in generating the existing clock gate with at least a portion of logic associated with the enable conditions.

19. The system of claim 13, wherein the RTL netlist is associated with a prototype integrated circuit design.

20. The system of claim 13, wherein the RTL netlist is representative of a physical integrated circuit.

21. The system of claim 13, wherein a physical integrated circuit is manufactured based on the revised RTL netlist.

22. The system of claim 13, wherein power consumption of an integrated circuit manufactured according to the revised RTL netlist is less than power consumption of an integrated circuit manufactured according to the RTL netlist pre-revising.

23. The system of claim 13, wherein the RTL netlist comprises a plurality of serially connected latches.

24. The system of claim 13, wherein calculating the set of enable conditions includes evaluating whether an integrated circuit parameter will be violated by updating the IC design according to the set of enable conditions.

25. A computer-readable medium encoded with instructions for commanding a processing system to execute a method for reducing power consumption of a of an integrated circuit (IC) according to an IC design, the method comprising:
  accessing a register transfer level (RTL) netlist of the IC design, the RTL netlist comprising a RTL representation of the IC;
  computing a first set of conditions of a first latch in the RTL netlist that indicates whether an output of the first latch is observable by a downstream circuit;
  computing, a second set of conditions including at least one stability condition for the latch;
  calculating a set of enable conditions based on the first set of conditions and the second set of conditions;
  generating a clock gate circuit based on the set of enable conditions, the clock gate circuit including a second latch and a logic gate comprising an OR gate or an AND gate; and
  modifying the IC design by revising the RTL netlist to include the clock gate circuit.

* * * * *